US006594790B1

(12) United States Patent
Sato et al.

(10) Patent No.: US 6,594,790 B1
(45) Date of Patent: Jul. 15, 2003

(54) DECODING APPARATUS, CODING APPARATUS, AND TRANSMISSION SYSTEM EMPLOYING TWO INTRA-FRAME ERROR CONCEALMENT METHODS

(75) Inventors: Noriyuki Sato, Tokyo (JP); Shigeru Fukunaga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/563,840

(22) Filed: May 4, 2000

(30) Foreign Application Priority Data

Aug. 25, 1999 (JP) .......................................... 11-237776

(51) Int. Cl.$^7$ ................................................ H04N 7/68
(52) U.S. Cl. ............... 714/746; 348/845.1; 375/240.27; 714/747
(58) Field of Search ................. 714/746, 747; 375/240.27; 348/845.1

(56) References Cited

U.S. PATENT DOCUMENTS

| 4,807,033 A | * | 2/1989 | Keesen et al. ............... 348/616 |
| 5,228,028 A | * | 7/1993 | Cucchi et al. ............... 370/392 |
| 5,243,428 A | * | 9/1993 | Challapali et al. ........... 348/607 |
| 5,247,363 A | * | 9/1993 | Sun et al. ..................... 348/616 |
| 5,353,059 A | * | 10/1994 | Lawlor et al. ......... 375/240.11 |
| 5,400,076 A | * | 3/1995 | Iwamura ................. 375/240.15 |
| 5,442,400 A | * | 8/1995 | Sun et al. ............... 375/240.15 |
| 5,559,558 A | * | 9/1996 | Kitazato ................. 375/240.12 |
| 5,570,199 A | * | 10/1996 | Tanaka et al. ................. 386/95 |
| 5,621,467 A | * | 4/1997 | Chien et al. ............ 375/240.15 |
| 5,715,008 A | * | 2/1998 | Sekiguchi et al. ...... 375/240.15 |
| 5,737,022 A | * | 4/1998 | Yamaguchi et al. ... 375/240.15 |
| 5,748,784 A | * | 5/1998 | Sugiyama ................... 382/236 |
| 5,809,041 A | * | 9/1998 | Shikakura et al. .......... 714/747 |
| 6,128,339 A | * | 10/2000 | Park ....................... 375/240.27 |

OTHER PUBLICATIONS

Telecommunication Standardization Sector of ITU, "Video Codec for Audiovisual Services at px64 kbits," ITU–T Recommendation H.261, adopted Mar. 1993, pp. 1–25.
Telecommunication Standardization Sector of ITU, "Video Coding for Low Bitrate Communication," DRAFT ITU–T Recommendation H.263 as of Dec., 1995, pp. 1–41.

* cited by examiner

Primary Examiner—Stephen M. Baker
(74) Attorney, Agent, or Firm—Venable LLP; Michael A. Sartori

(57) ABSTRACT

In a system that divides data frames into blocks and codes at least some of the blocks by intra-frame coding, errors in decoding these blocks are concealed by two methods: replacement of the erroneous block by its DC component, and replacement of the erroneous block with data from the preceding frame. The selection between these two methods is made according to one or more of the following criteria: reliability of the DC value; motion-vector size; motion-vector change from the preceding frame; and whether intra-frame coding was selected or forced. These selection criteria improve the probability of successful error concealment.

31 Claims, 12 Drawing Sheets

DECODING APPARATUS, CODING APPARATUS, AND TRANSMISSION SYSTEM EMPLOYING TWO INTRA-FRAME ERROR CONCEALMENT METHODS

BACKGROUND OF THE INVENTION

The present invention relates to apparatus for coding and decoding data transmitted in a series of frames, such as frames of moving-picture data, more particularly to methods of concealing errors when the data cannot be decoded correctly.

Coding methods that compress moving-picture data are described in, for example, recommendations H.261 and H.263 of the Telecommunication Standardization Sector of the International Telecommunication Union (ITU-T), and in standards that have been developed by the Moving Picture Experts Group (MPEG) and adopted by the International Organization for Standardization (ISO). These methods are used extensively in videoconferencing systems, video-on-demand (VOD) systems, and other moving-picture transmission systems.

In these coding methods, each frame of a moving picture is divided into eight-by-eight blocks or sixteen-by-sixteen macroblocks of picture elements (pixels). Blocks and macroblocks will both be referred to as 'blocks' below. Each block is coded by one of two general techniques: intra-frame coding, which codes the block independently; and inter-frame coding, which codes the block with reference to a block in a preceding frame, by coding the differences between corresponding pixel values in the two blocks. Inter-frame coding may include motion compensation. Regardless of which technique is used, the standard methods mentioned above employ an orthogonal transform, followed by quantization and entropy coding, to compress the block data. In each block, the orthogonal transform produces an average pixel value or average difference value for the block, referred to as a DC coefficient, and a set of values, referred to as AC coefficients, representing higher spatial frequencies.

Each block is preferably coded by the technique that produces the higher compression ratio. Usually, this is the inter-frame coding technique. Blocks coded by intra- and inter-frame coding will be referred to as intra-blocks and inter-blocks, respectively.

A general problem in moving-picture transmission systems is that the coded data may be corrupted by transmission errors, which can make correct decoding of the data impossible. Such errors have an unfortunate tendency to propagate, making it impossible to decode succeeding data as well. One reason is the variable length of the codewords employed in entropy coding. If a variable-length codeword is corrupted, the error can propagate into succeeding codewords by obscuring the boundaries between the codewords. Another reason is inter-frame coding. An error in one frame can propagate to the next frame by corrupting the reference data used in decoding inter-blocks.

To limit error propagation due to entropy coding, a common practice is to insert synchronization codes at certain positions in the coded data. To limit inter-frame error propagation, a common practice is to force each block to be coded by intra-frame coding at predetermined intervals, regardless of the compression ratio. A block coded in this way is referred to as a forced intra-block.

When a decoding error is detected, measures are taken to conceal the error. It is particularly important to conceal errors in intra-blocks, because the effect of these errors on picture quality can be severe. The effect of errors in inter-blocks is usually smaller, because the inter-block data values themselves are usually small.

One known error concealment method replaces an erroneous block with a corresponding block from the preceding frame: either the block in the same position in the preceding frame, or a block in a position specified by a motion vector. This method will be referred to as temporal replacement. Temporal replacement succeeds or fails, depending on the degree of similarity between the erroneous block and the replacement block.

Another known method replaces an erroneous block with a single DC value: either the DC value of the block itself, if this value can be recovered, or a value obtained from adjacent blocks. This method will be referred to as DC replacement. DC replacement avoids extreme picture distortion, but loses all detail within the replaced block.

Both of these methods have been applied to conceal errors in intra-blocks, but the results are unsatisfactory. With the temporal replacement method, severe picture distortion occurs whenever the replacement block happens to differ greatly from the erroneous block, and the severe distortion propagates by inter-frame coding into succeeding frames. With the DC replacement method, the probability of severe picture distortion is reduced, but the distortion that occurs is usually still obvious, and in many cases the distortion could have been avoided by temporal replacement. This is particularly true of forced intra-blocks, which often differ only slightly from the corresponding block in the preceding frame.

The DC replacement method does not reduce the probability of severe picture distortion to zero, because there may be an undetected error in the DC coefficient value itself. It is particularly unfortunate that the DC replacement method sometimes uses an incorrect DC coefficient value, causing unsightly picture distortion, when the error could have been concealed with little or no distortion by temporal replacement.

SUMMARY OF THE INVENTION

The present invention deals with the above error-concealment problems by using both the temporal replacement method and DC replacement method, selecting one method or the other on a block-by-block basis. A particular object of the invention is to provide appropriate criteria for choosing between the two methods for intra-blocks.

The invented error-concealment method includes decoding the AC component and DC component of each intra-block separately, and detecting decoding errors. When an error is detected, at least one of four conditions is tested: whether the DC coefficient is within a predicted range; whether the intra-block has a motion vector outside an acceptable range; whether the change in the motion vector is outside an acceptable range; and whether the intra-block was non-forced. The error is concealed by DC replacement if all of the tested conditions are satisfied, and by temporal replacement if any one of the tested conditions is not satisfied.

The tested condition(s) may be any one of the above four conditions, any combination of two or three of the conditions, or all four of the conditions.

When any of the first three conditions is used, the size of the predicted range or acceptable range may be adjusted in response to an external signal.

The invention also provides a decoder employing the invented error concealment method, and a transmission system including this decoder and a coder. If the non-forced intra-block condition is used, the coder includes a forced-intra signal transmitter that informs the decoder of forced intra-blocks.

DETAILED DESCRIPTION OF THE INVENTION

Figure 1:
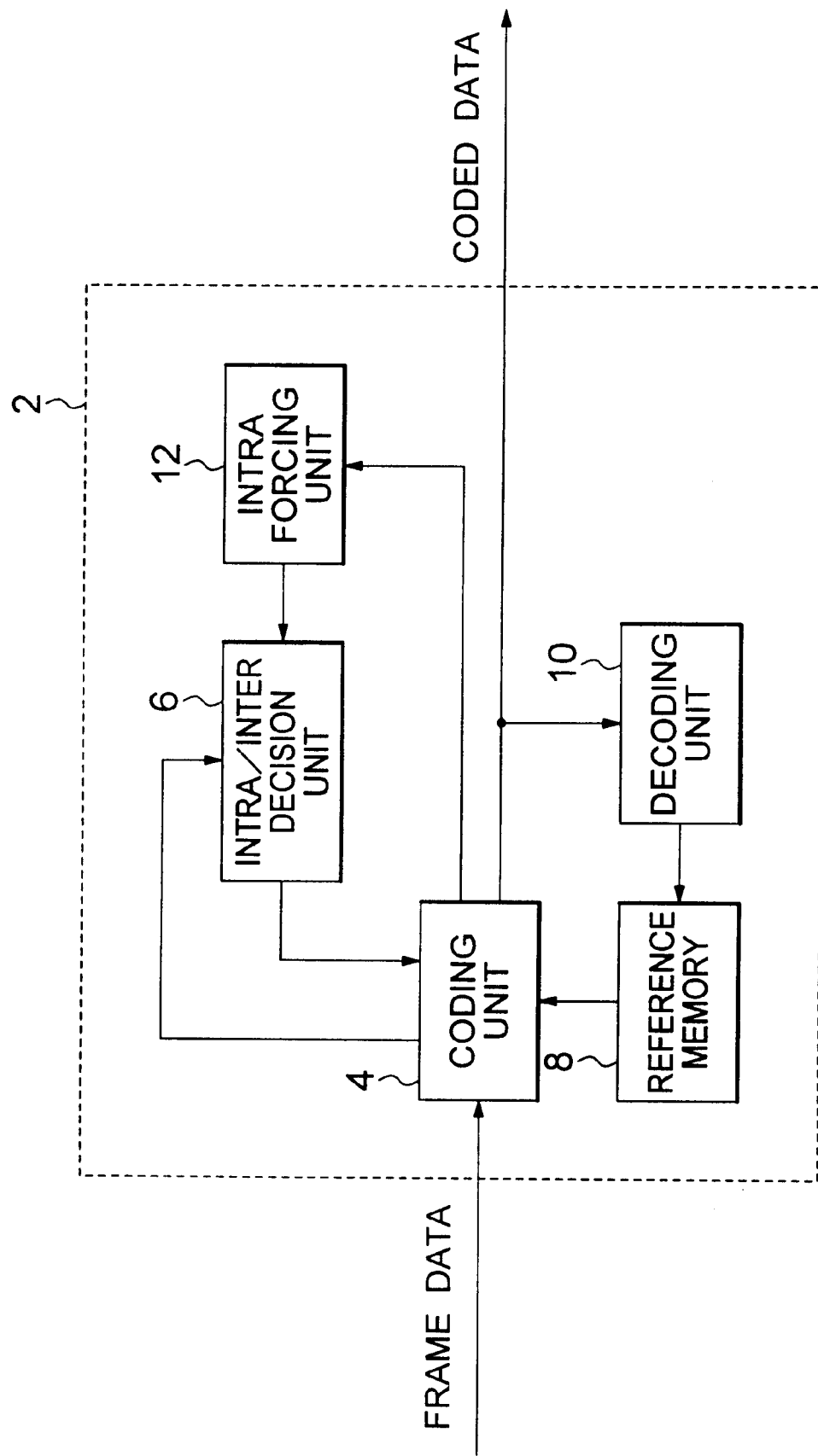
FIG. 1 is a block diagram illustrating a conventional coder.

Embodiments of the invention will be described with reference to the attached illustrative drawings, in which like elements are indicated by like reference characters. First, however, a description will be given of a conventional moving-picture transmission system, parts of which will be used in or compared with the embodiments.

The conventional moving-picture transmission system comprises a coder and a decoder, linked by a data transmission channel such as a telecommunication channel.

Referring to FIG. 1, the conventional coder 2 comprises a coding unit 4, an intra/inter decision unit 6, a reference memory 8, a decoding unit 10, and an intra forcing unit 12.

The conventional coder 2 receives moving-picture data one frame at a time. The coding unit 4 codes each block in the frame by intra-frame coding or inter-frame coding, as selected by the intra/inter decision unit 6, referring to reference data stored in the reference memory 8 for inter-frame coding. The coded data are supplied to the transmission channel (not visible) and the decoding unit 10. The decoding unit 10 decodes the coded data, and places the decoded data in the reference memory 8 for use as reference data in future inter-frame coding.

When coding each block, the coding unit 4 also notifies the intra forcing unit 12 of the frame number, block number, and selected coding method. The intra forcing unit 12 keeps track of this information, and forces the intra/inter decision unit 6 to select intra-frame coding for any block that has been coded as an inter-block in the most recent N consecutive frames, where N is a predetermined integer. This assures that every block is coded as an intra-block at least once every N+1 frames.

When intra-frame coding is forced by the intra forcing unit 12, the intra/inter decision unit 6 preferably notifies the coding unit 4 in time for the coding unit 4 to proceed directly to the intra-frame coding process. In other cases, before actually coding the block, the coding unit 4 performs preliminary processes, such as variation estimation and motion estimation, that yield estimates of the amounts of coded data that will be produced by intra-frame coding and inter-frame coding. The coding unit 4 reports these estimated amounts to the intra/inter decision unit 6, which then selects intra-frame coding or inter-frame coding for the block, by choosing the method that is estimated to code the block more efficiently.

The coded blocks are grouped into units. Different units are used in different coding and transmission standards. Group of blocks, group of pictures, slice, and video packet are examples of the units employed. For simplicity, 'slice' will be used below as a generic name for any of these groupings.

Figure 2A:
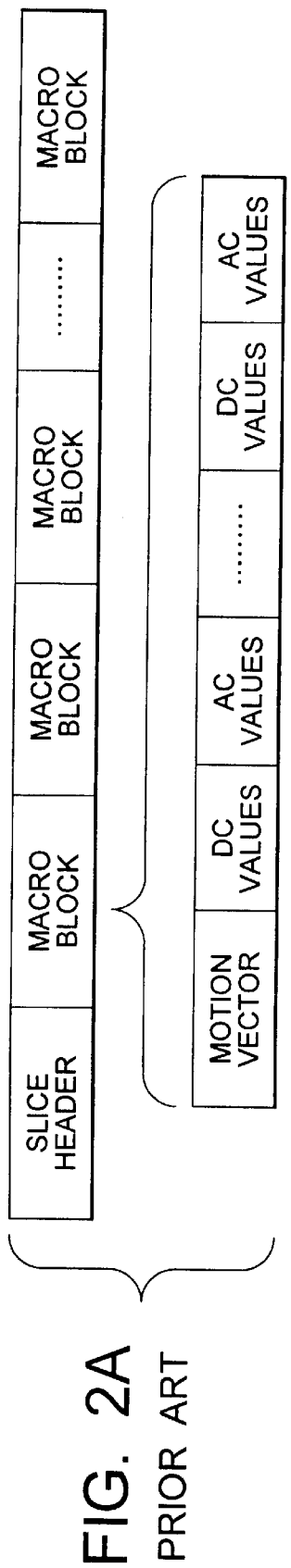
FIGS. 2A, 2B, and 2C illustrate conventional coded data formats.

Slices of coded data are transmitted in various standard formats. FIG. 2A shows one format, in which a slice header is followed by the data for each block in the slice, arranged one macroblock after another. The slice header begins with a synchronization code referred to as a start code. The coded data for each macroblock include a motion vector, if inter-frame coding is employed, followed by the DC coefficient value of the first block in the macroblock, then the coded AC coefficient values for that block, and so on for the other blocks in the macroblock.

Figure 2B:
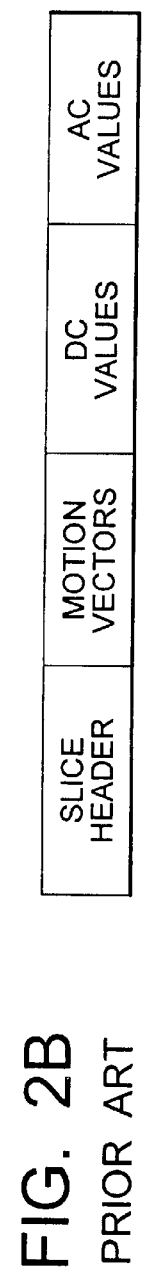

FIG. 2B shows another format, in which the slice header is followed by the motion vectors of all blocks in the slice, then the DC coefficient values of all blocks in the slice, and finally the AC coefficient values of all blocks in the slice. This format protects the motion vectors and DC coefficient values from possible corruption by errors in the variable-length codewords of the AC coefficient values.

Figure 2C:

FIG. 2C shows a variation of the format in FIG. 2B. This variation inserts another synchronization (sync) code between the motion-vector data and the DC coefficient values, to protect the DC coefficients from possible corruption by errors in the motion-vector data. This format is particularly useful when variable-length coding of motion vectors is employed.

Figure 3:
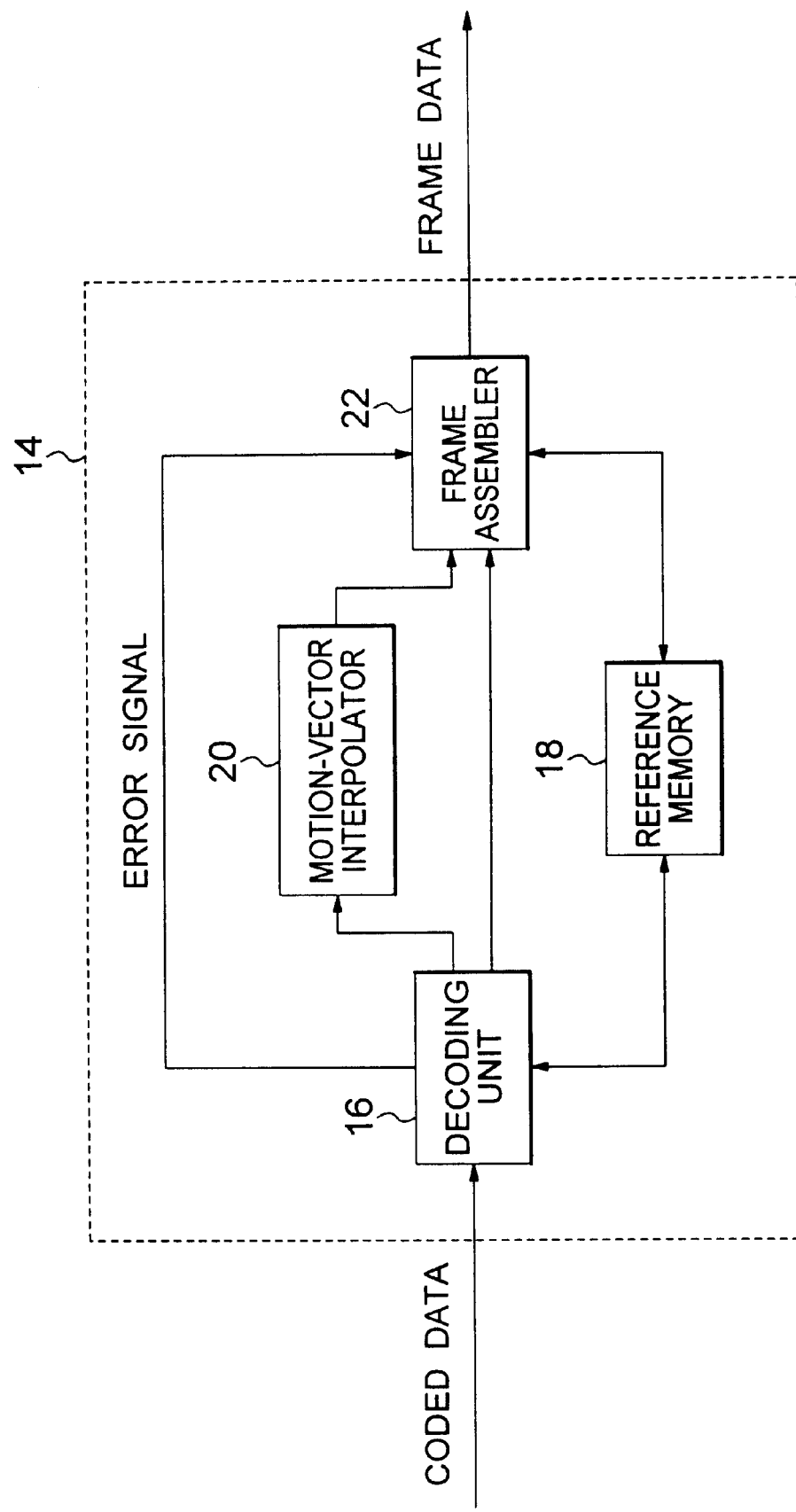
FIG. 3 is a block diagram illustrating a conventional decoder.

FIG. 3 shows the decoder in the conventional moving-picture transmission system. This conventional decoder 14, which uses the temporal replacement method of error concealment, comprises a decoding unit 16, a reference memory 18, a motion-vector interpolator 20, and a frame assembler 22.

The decoding unit 16 decodes each block of incoming coded data, referring to reference data stored in the reference memory 18 for inter-blocks; supplies the decoded motion vectors of inter-blocks to the motion-vector interpolator 20; and supplies the decoded picture data to the frame assembler 22. If the decoding unit 16 detects an error in the coded data, it sends an error signal to the frame assembler 22.

The motion-vector interpolator 20 estimates the motion vectors of intra-blocks, and of inter-blocks for which motion vectors were not obtained from the coded data, either because the coding syntax intentionally omitted the motion vectors, or because the block was corrupted by a transmission error.

The frame assembler 22 assembles the decoded data for a complete frame, outputs the completed frame data to be processed or displayed by further apparatus (not visible), and writes the completed frame data into the reference memory 18, so that the reference memory 18 always stores the data for the most recent frame. When notified of an error, the frame assembler 22 also carries out error concealment by replacing the erroneous block with a block from the preceding frame.

Figure 4:
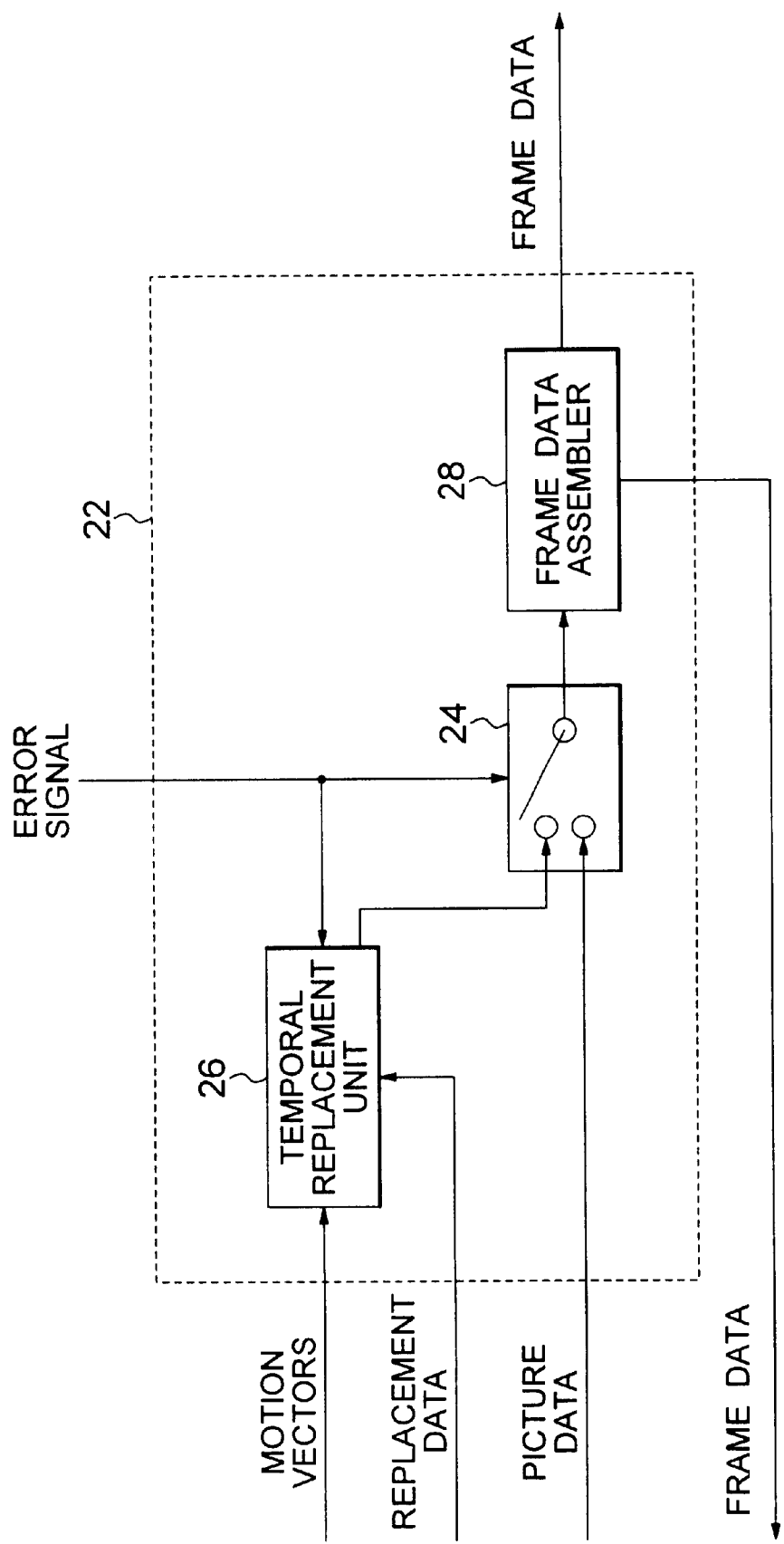
FIG. 4 is a more detailed block diagram illustrating the frame assembler in FIG. 3.

Referring to FIG. 4, the frame assembler 22 comprises a data selector 24, a temporal replacement unit 26, and a frame data assembler 28. The data selector 24 is controlled by the error signal from the decoding unit 16, selecting the decoded picture data supplied by the decoding unit 16 when no error is reported, and selecting replacement data output from the temporal replacement unit 26 when an error is reported. The temporal replacement unit 26 obtains the replacement data from the reference memory 18, by reading memory locations specified by a motion vector received from the motion-vector interpolator 20. The frame data assembler 28 assembles the blocks of picture data selected by the data selector 24 into a complete frame, supplies the frame data as output data, and writes the frame data into the reference memory 18.

The invented data transmission system comprises the conventional coder 2 shown in FIG. 1, or a novel coder that will be shown later, and a novel decoder. The coder may transmit coded picture data to the decoder in real time over a communication channel. Alternatively, the coded picture data may be transmitted to a recording device, stored on a recording medium, then reproduced from the recording medium and transmitted to the decoder. The system may include a plurality of coders, a plurality of decoders, or a plurality of both.

Although the invention can be practiced with any data format, a format that provides comparatively strong protection for DC coefficient data, such as the formats in FIGS. 2B and 2C, is preferred.

Several embodiments of the invented data transmission system will now be described.

Figure 5:
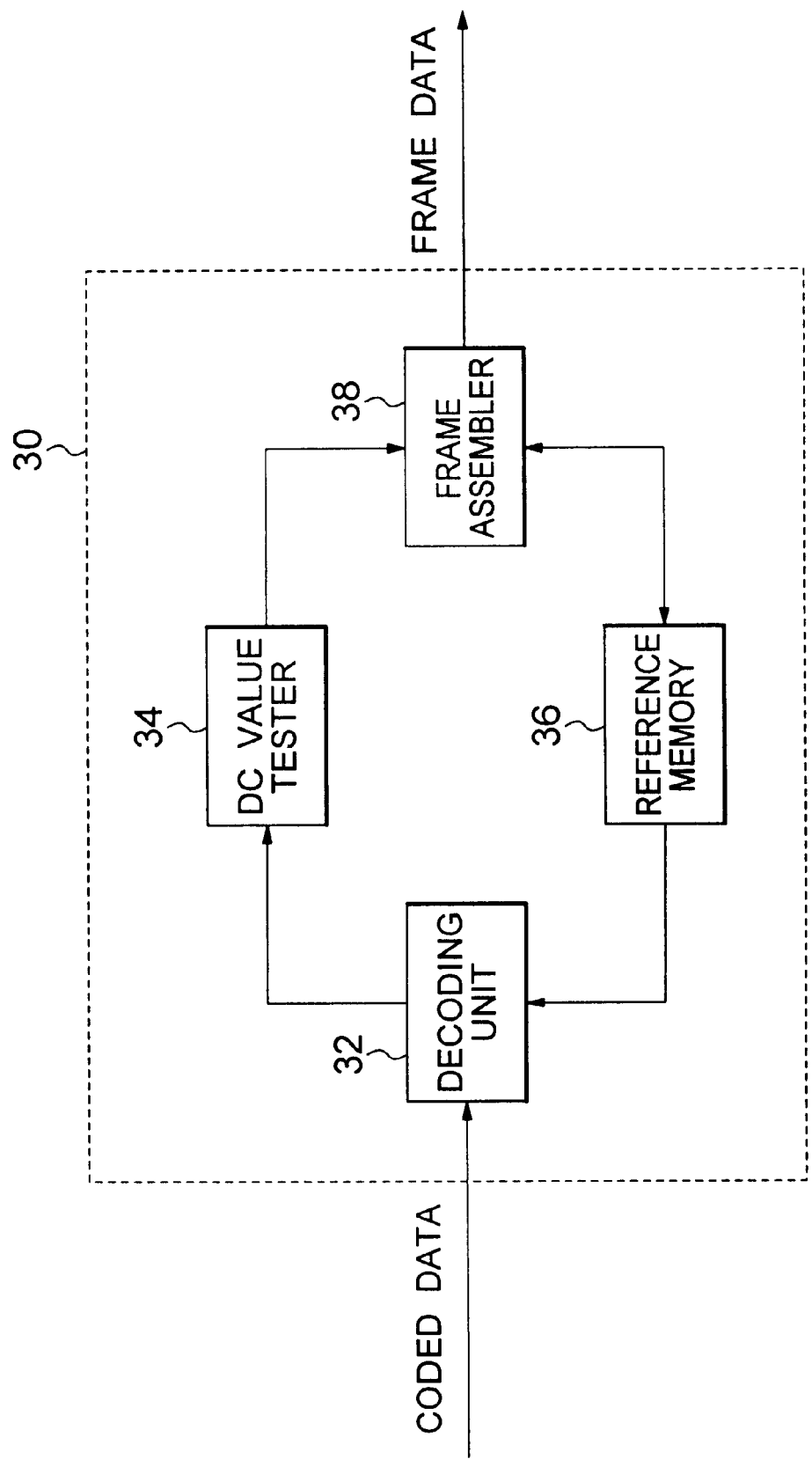
FIG. 5 is a block diagram illustrating a decoder in a first embodiment of the invention.

The first embodiment includes the conventional coder 2 of FIG. 1 and the decoder 30 shown in FIG. 5. This decoder 30 comprises a decoding unit 32, a DC value tester 34, a reference memory 36, and a frame assembler 38.

The decoding unit 32 receives coded data and examines the coded data for errors such as syntax errors, illegal codewords, and motion vectors that point to illegal locations. Any such errors are reported to the DC value tester 34. The decoding unit 32 decodes the received data, as far as possible, referring to reference data stored in the reference memory 36 for inter-blocks, and supplies the decoded picture data to the frame assembler 38. Differing from the conventional decoding unit, however, the decoding unit 32 decodes the AC and DC components of the picture data separately, and supplies these components separately to the frame assembler 38. The decoding unit 32 also supplies the frame assembler 38 with the motion vectors of inter-blocks, and supplies the DC value tester 34 with the DC coefficient values of all blocks for which a DC value can be decoded.

The DC value tester 34 stores the DC value of each block in the current frame. When notified of an intra-block error by the decoding unit 32, the DC value tester 34 predicts the DC value of the erroneous block from the DC values of the surrounding blocks, and compares the predicted DC value with the DC value (if any) received from the decoding unit 32 for the erroneous block. If the received DC value is within a predicted range around the predicted DC value, the DC value tester 34 sends the frame assembler 38 an error concealment signal designating DC replacement. If the DC value of the erroneous block is outside the predicted range, or is not received, the DC value tester 34 sends the frame assembler 38 an error concealment signal designating temporal replacement.

The predicted DC value is, for example, the average of the DC values of the eight closest neighboring blocks, disposed above, below, to the right, and to the left of the erroneous block, and in the four diagonally adjacent positions. Alternatively, the predicted DC value is a weighted average of these eight values. The size of the predicted range is, for example, the variance of the eight values multiplied by a predetermined constant.

The frame assembler 38 obtains picture data for each block, operating according to the error concealment signal received from the DC value tester 34 for erroneous blocks; assembles the blocks into a completed frame; outputs the completed frame data to be processed or displayed by further apparatus (not visible); and writes the completed frame data in the reference memory 36, so that the reference memory 36 always stores the data for the most recent frame.

Figure 6:
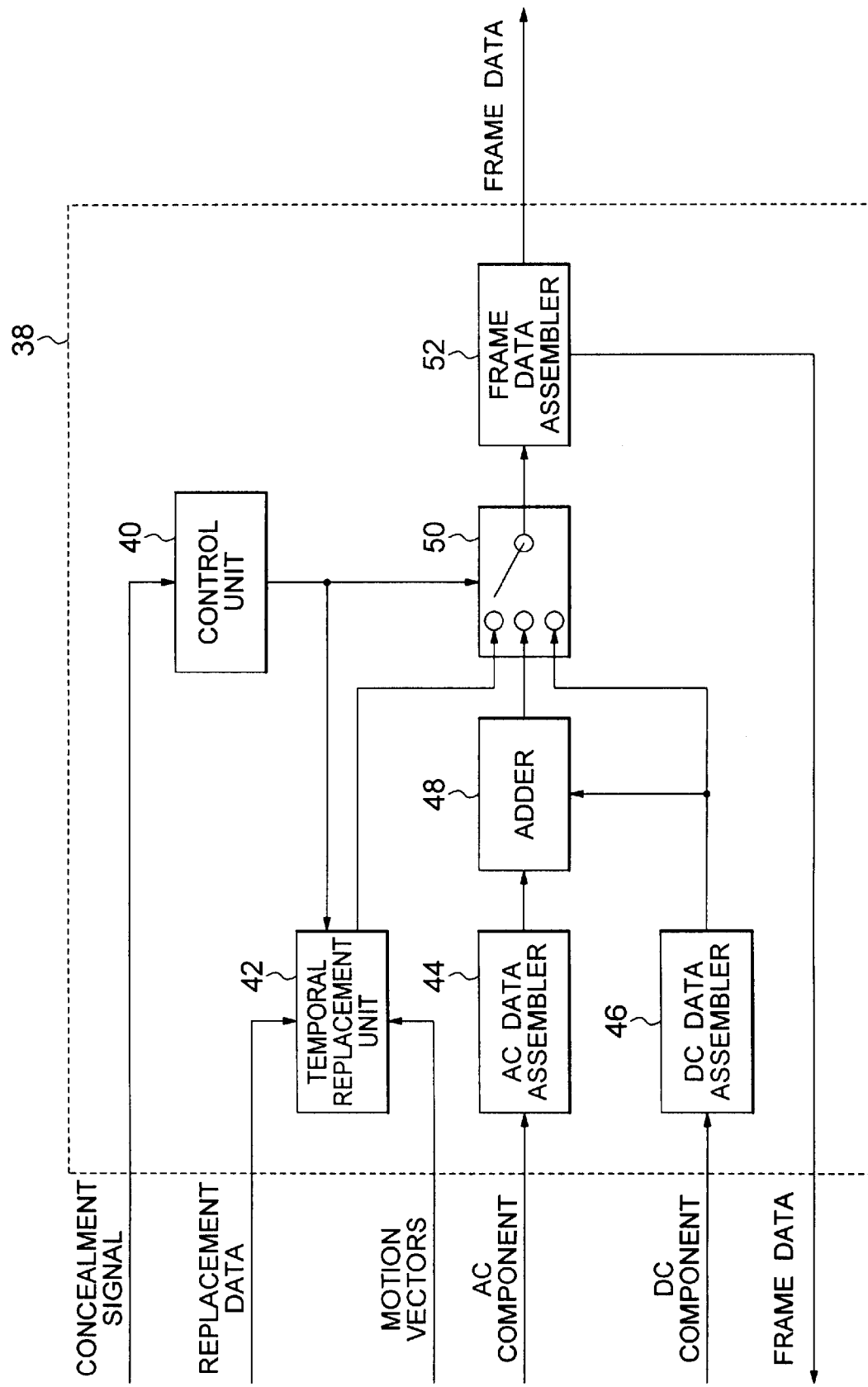
FIG. 6 is a more detailed block diagram illustrating the frame assembler in FIG. 5.

Referring to FIG. 6, the frame assembler 38 comprises a control unit 40, a temporal replacement unit 42, an AC data assembler 44, a DC data assembler 46, an adder 48, a data selector 50, and a frame data assembler 52.

On command from the control unit 40, the temporal replacement unit 42 reads replacement data for an erroneous block from a location in the reference memory 36 specified by the motion vector of the block, as received from the decoding unit 32. If no motion vector was received, the temporal replacement unit 42 obtains a motion vector by interpolation from the motion vectors of neighboring blocks, if possible.

The AC data assembler 44 receives and temporarily stores the AC component data output by the decoding unit 32. The DC data assembler 46 receives and temporarily stores the DC component data output by the decoding unit 32. The adder 48 adds the AC values stored in the AC data assembler 44 to the DC values stored in the DC data assembler 46.

The control unit 40 controls the temporal replacement unit 42 and data selector 50 according to the error concealment signal received from the DC value tester 34. When no error concealment signal is received, the control unit 40 directs the data selector 50 to select the output of the adder 48. When error concealment by DC replacement is designated, the control unit 40 directs the data selector 50 to select the output of the DC data assembler 46. When error concealment by temporal replacement is specified, the control unit 40 activates the temporal replacement unit 42, and directs the data selector 50 to select the output of the temporal replacement unit 42.

The frame data assembler 52 assembles the blocks of picture data selected by the data selector 50 into complete frames, outputs each completed frame for display or other processing, and writes the completed frame data into the reference memory 36.

Next, the operation of the decoder 30 will be described. The description will focus mainly on the concealment of errors in intra-blocks.

When the decoding unit 32 detects an error in an intra-block, if the DC coefficient value of the block can be decoded, the decoding unit 32 supplies that value, representing the average pixel value in the block, to the frame assembler 38 and DC value tester 34. In the frame assembler 38, the DC data assembler 46 assigns the supplied DC coefficient value to all pixels in the block. The DC value tester 34 tests the supplied DC coefficient value and selects DC replacement or temporal replacement as described above.

If the DC value tester 34 selects DC replacement, then in the frame assembler 38, the data selector 50 selects the output of the DC data assembler 46, and the frame data assembler 52 receives a block in which every pixel has the same value.

If the DC value tester 34 selects temporal replacement, the control unit 40 activates the temporal replacement unit 42. The temporal replacement unit 42 attempts to construct a motion vector for the erroneous intra-block by interpolation from the motion vectors of neighboring inter-blocks, which the temporal replacement unit 42 obtains from the decoding unit 32. If interpolation is not possible, the temporal replacement unit 42 assumes a zero motion vector. The temporal replacement unit 42 then reads the reference memory 36 to obtain a block of picture data from the preceding frame, at the location indicated by the motion vector, and the data selector 50 selects this block.

As explained above, the DC value tester 34 selects DC replacement whenever the DC coefficient value of an erroneous intra-block is within the predicted range. That is, DC replacement is selected whenever the DC value appears likely to be correct, as judged from the DC values of other blocks. If the DC value appears likely to be incorrect, then temporal replacement is used as a fall-back method. By using the comparatively safe DC replacement method preferentially, and falling back on temporal replacement only if the DC coefficient value appears to be erroneous, the decoder 30 avoids severe picture distortion whenever possible.

When an intra-block is not erroneous, the DC data assembler 46 assigns the DC coefficient value to all pixels in the block, the adder 48 adds the AC component values stored in the AC data assembler 44, the data selector 50 selects the output of the adder 48, and the frame data assembler 52 receives the correctly decoded data.

When an inter-block is decoded, the DC data assembler 46 receives, as the DC component, the DC coefficient value added to the pixel values of the reference block stored in the reference memory 36. The adder 48 adds the AC component values, the data selector 50 selects the output of the adder 48, and the frame data assembler 52 again receives the correctly decoded data, provided the block is not erroneous.

When an inter-block is erroneous, the error is concealed as described above, the DC value tester 34 testing the DC coefficient value and selecting DC replacement or temporal replacement. For temporal replacement, the temporal replacement unit 42 uses the motion vector of the erroneous block itself, if the decoding unit 32 succeeded in decoding this motion vector.

For most inter-blocks, the DC coefficient value is small, and there is little difference between DC replacement and temporal replacement.

Compared with the conventional decoder 14, which always uses temporal replacement, even for intra-blocks, the decoder 30 in the first embodiment greatly reduces the probability of severe picture damage in non-forced intra-blocks, which usually differ greatly from the temporal replacement block. At the same time, the decoder 30 in the first embodiment avoids the mistake of using DC replacement when the DC coefficient is badly erroneous and temporal replacement would have worked better.

Figure 7:
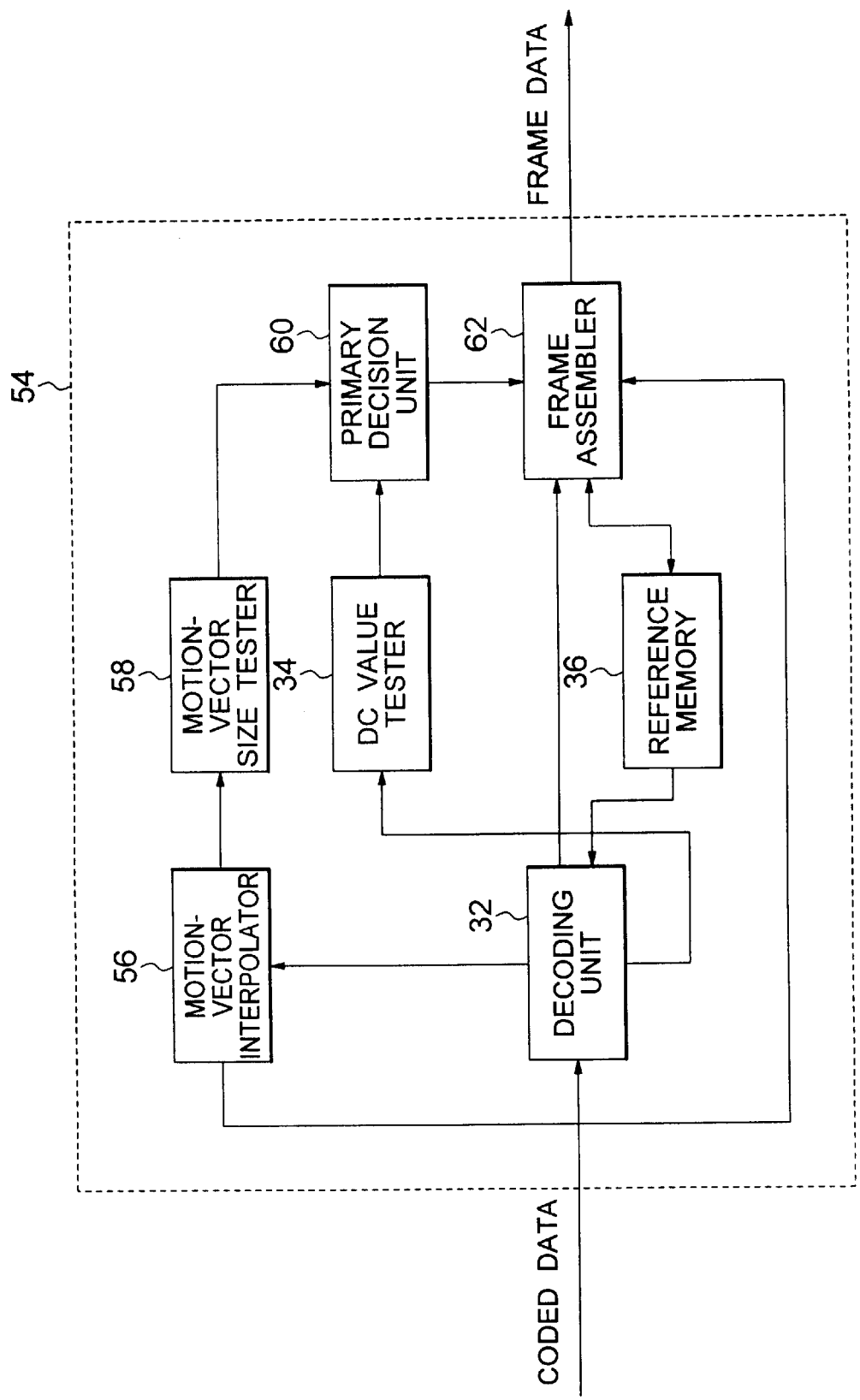
FIG. 7 is a block diagram illustrating a decoder in a second embodiment of the invention.

The second embodiment of the invented data transmission system includes the conventional coder 2 of FIG. 1 and the decoder 54 shown in FIG. 7. This decoder 54 comprises a decoding unit 32, a DC value tester 34, and a reference memory 36 as described in the first embodiment, a motion-vector interpolator 56, a motion-vector size tester 58, a primary decision unit 60, and a frame assembler 62 differing from the frame assembler of the first embodiment.

The decoding unit 32 operates as described in the first embodiment, except that it supplies motion-vector information to both the motion-vector interpolator 56 and the frame assembler 62, and notifies both the DC value tester 34 and the motion-vector interpolator 56 of decoding errors.

The DC value tester 34 and reference memory 36 operate as described in the first embodiment.

The motion-vector interpolator 56 uses the motion-vector information supplied by the decoding unit 32 to interpolate motion vectors for intra-blocks and other blocks for which the decoding unit 32 does not supply motion vectors. When notified by the decoding unit 32 of an erroneous intra-block, the motion-vector interpolator 56 supplies the interpolated motion vector of the erroneous intra-block to the motion-vector size tester 58 and frame assembler 62. The motion-vector interpolator 56 also supplies the motion-vector size tester 58 with the motion vectors of erroneous inter-blocks.

The motion-vector size tester 58 tests the size the horizontal and vertical components of any motion vectors received from the motion-vector interpolator 56, to determine whether the size is within an acceptable range. The acceptable range is, for example, from zero to the block size, from zero to the macroblock size, or from zero to the block size multiplied by a predetermined constant. If the size of both the horizontal and vertical components is within the acceptable range, the motion-vector size tester 58 sends the primary decision unit 60 an error concealment signal designating temporal replacement. If the size of either component is outside the acceptable range, the motion-vector size tester 58 sends the primary decision unit 60 an error concealment signal designating DC replacement.

For erroneous blocks, the primary decision unit 60 receives error concealment signals from both the DC value tester 34 and the motion-vector size tester 58. If both error concealment signals designate DC replacement, the primary decision unit 60 sends the frame assembler 62 an error concealment signal designating DC replacement. If either the DC value tester 34 or the motion-vector size tester 58 designates temporal replacement, the primary decision unit 60 sends the frame assembler 62 an error concealment signal designating temporal replacement.

The frame assembler 62 obtains picture data for each block, assembles the blocks into a completed frame, outputs the completed frame data to be further processed or displayed, and writes the completed frame data into the reference memory 36. For erroneous blocks, the frame assembler 62 also performs error concealment according to the error concealment signal received from the primary decision unit 60.

Figure 8:
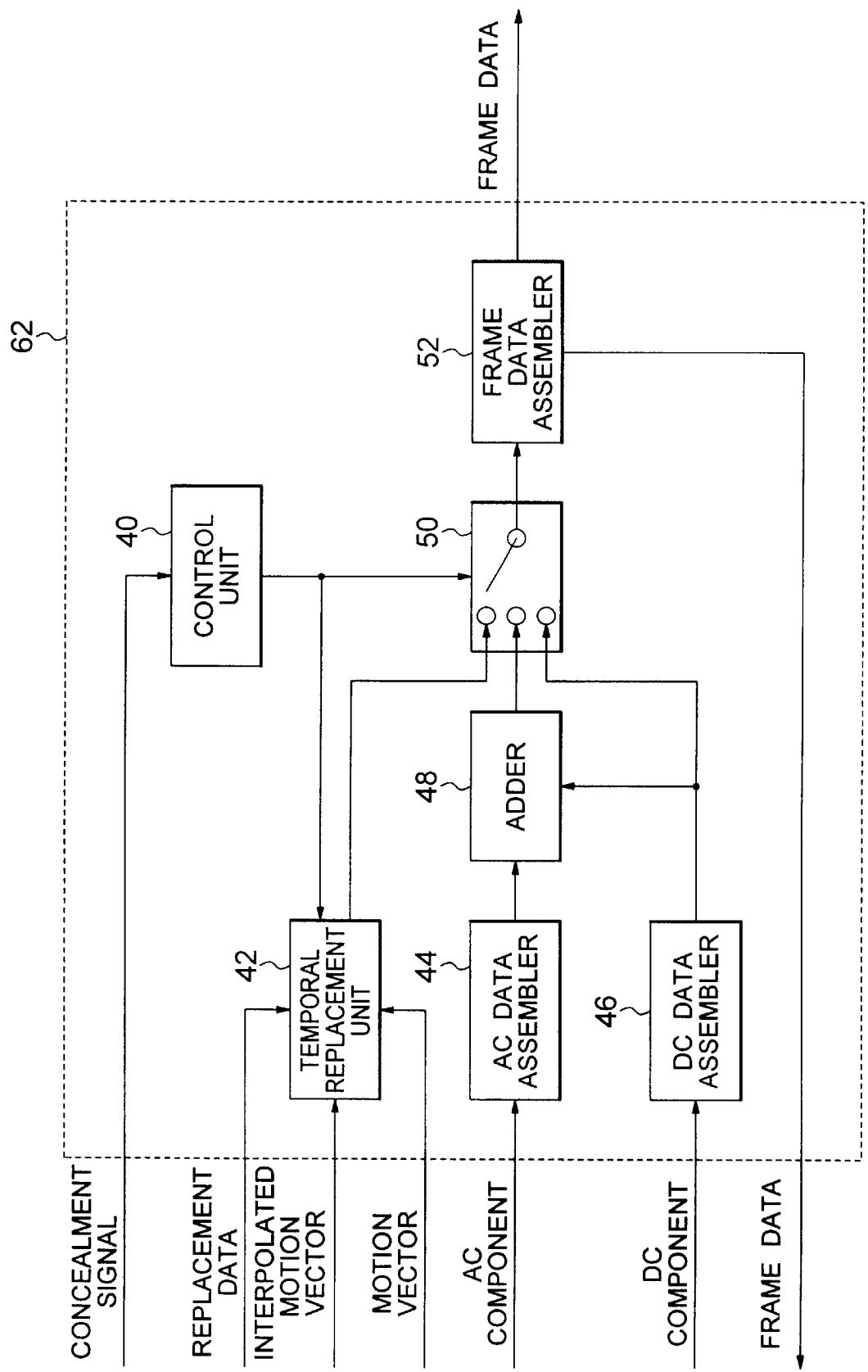
FIG. 8 is a more detailed block diagram illustrating the frame assembler in FIG. 7.

Referring to FIG. 8, the frame assembler 62 comprises a control unit 40, an AC data assembler 44, a DC data assembler 46, an adder 48, a data selector 50, and a frame data assembler 52 as described in the first embodiment, and a temporal replacement unit 64 that differs from the temporal replacement unit in the first embodiment. The difference is that the temporal replacement unit 64 does not interpolate motion vectors. When the temporal replacement unit 64 cannot obtain a needed motion vector from the decoding unit 32, it obtains an interpolated motion vector (or zero motion vector, if interpolation was not possible) from the motion-vector interpolator 56.

Next, the operation of the decoder 54 will be described, again with attention primarily to the concealment of errors in intra-blocks.

When the decoding unit 32 detects an error in an intra-block, it notifies the DC value tester 34 and motion-vector interpolator 56. The motion-vector interpolator 56 constructs a motion vector for the intra-block by interpolation from neighboring blocks, the motion vectors of which have already been obtained. The motion-vector size tester 58 determines whether this motion vector is in the acceptable size range, selects temporal replacement if it is, and selects DC replacement if it is not.

The DC value tester 34 tests the DC coefficient value of the erroneous intra-block and outputs an error concealment signal as described in the first embodiment, selecting DC replacement if the DC coefficient of the block seems likely to be correct, and temporal replacement if the DC coefficient is missing or appears to be incorrect.

The primary decision unit 60 selects temporal replacement if either the DC value tester 34 or the motion-vector size tester 58 selects temporal replacement, and selects DC replacement if both the DC value tester 34 and the motion-vector interpolator 56 select DC replacement.

When the primary decision unit 60 selects temporal replacement, the temporal replacement unit 64 in the frame assembler 62 obtains the interpolated motion vector of the erroneous intra-block from the motion-vector interpolator 56, and reads the reference memory 36 to obtain replacement data from the preceding frame at the location indicated by the motion vector. The data selector 50 provides the frame data assembler 52 with the replacement data obtained by the temporal replacement unit 64.

When the primary decision unit 60 selects DC replacement, the data selector 50 supplies the frame data assembler 52 with a block, generated by the DC data assembler 46, in which all pixels have the value of the DC coefficient of the block.

Non-erroneous blocks are decoded as described in the first embodiment. Inter-block errors are concealed in the same way as intra-block errors, with motion-vector interpolation performed, if necessary, by the motion-vector interpolator 56.

In temporal replacement, the smaller the motion vector of a block is, the more closely the block tends to resemble the replacement block indicated by the motion vector. For simplicity, a motion vector in the acceptable range will be referred to as a small motion vector, and a motion vector outside the acceptable range as a large motion vector.

The primary decision unit 60 selects temporal replacement whenever the motion vector is small; in these cases, the temporal replacement block usually provides a close match to the correct data of the erroneous block. The primary decision unit 60 also selects temporal replacement when the DC coefficient appears to be incorrect; in this case, the temporal replacement block is at least preferable to the unreliable DC replacement block. DC replacement is used only when the motion vector is large and the DC coefficient seems reliable; in this case, DC replacement is safer than temporal replacement.

Whereas the conventional decoder 14 always uses temporal replacement for erroneous intra-blocks, and the decoder 30 in the first embodiment uses DC replacement whenever the DC coefficient appears reliable, the decoder 54 in the second embodiment uses the DC coefficient value and the motion-vector size to estimate the comparative risks and rewards of the two concealment methods, and selects the method that seems likely to do the better job. In particular, when both methods appear to be free of risk, the decoder 54 selects temporal replacement, which provides better picture quality.

In a variation of the second embodiment, instead of testing the horizontal and vertical components of the motion vector separately, the motion-vector size tester 58 tests the magnitude of the motion vector, by comparing the sum of the squares of the horizontal components with a predetermined value, for example. This variation also applies to the third embodiment.

Figure 9:
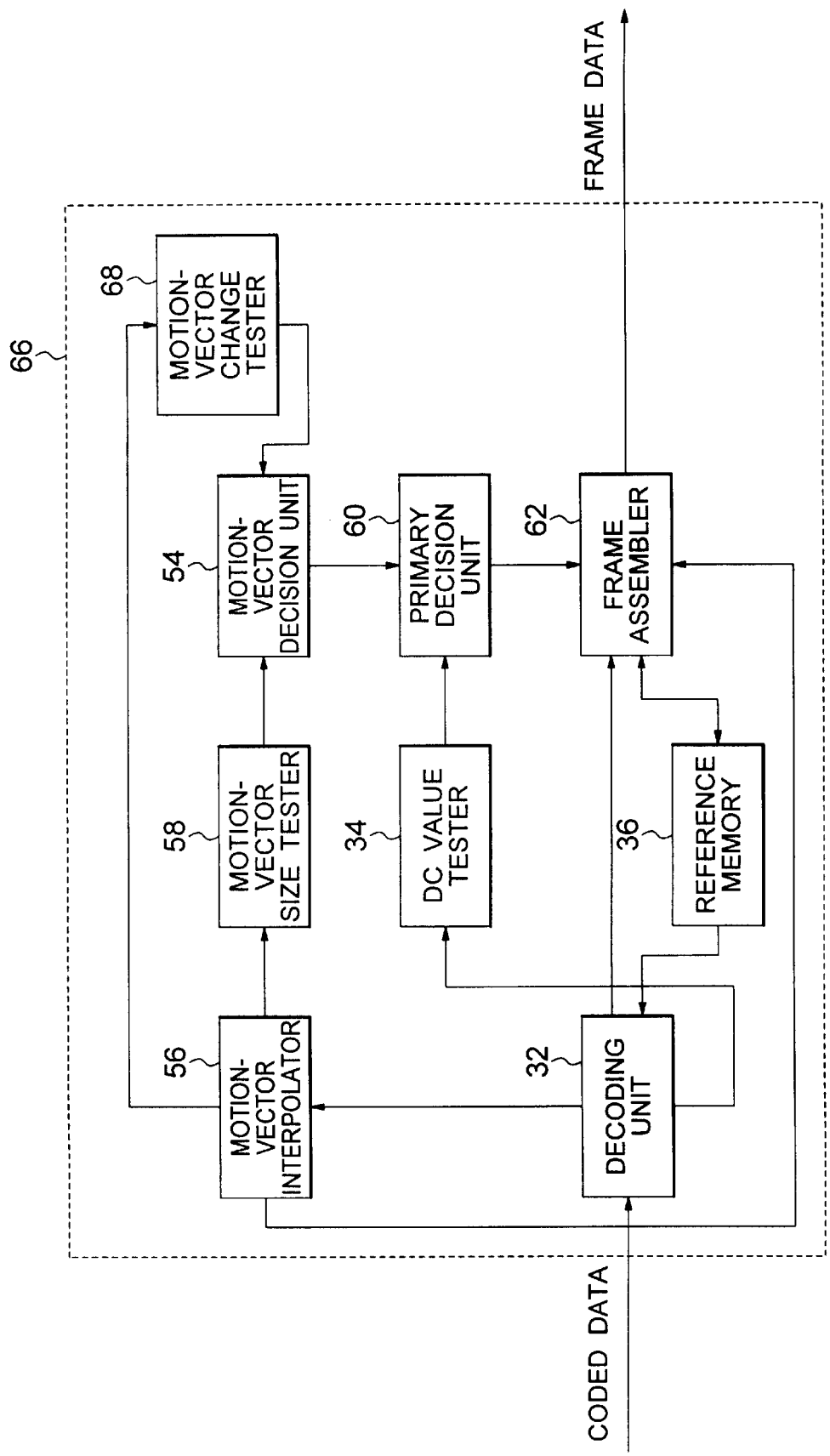
FIG. 9 is a block diagram illustrating a decoder in a third embodiment of the invention.

The third embodiment of the invented data transmission system includes the conventional coder 2 of FIG. 1 and the decoder 66 shown in FIG. 9. This decoder 66 adds a motion-vector change tester 68 and a motion-vector decision unit 70 to the configuration of the decoder 54 in the second embodiment. The motion-vector interpolator 56 now supplies the interpolated motion vectors of erroneous blocks to both the motion-vector size tester 58 and the motion-vector change tester 68. The motion-vector size tester 58 and motion-vector change tester 68 supply error concealment signals to the motion-vector decision unit 70, which supplies an error concealment signal to the primary decision unit 60. The other elements of the decoder 66 operate as described in the second embodiment.

The motion-vector change tester 68 obtains all the motion vectors output by the decoding unit 32 and all the interpolated motion vectors output by the motion-vector interpolator 56, and stores these motion vectors for the duration of at least one frame. When notified by the motion-vector interpolator 56 that a motion vector belongs to an erroneous block, the motion-vector change tester 68 compares the value of the motion vector with the value of the motion vector of the same block in the preceding frame, determines the change in the motion-vector value, and decides whether the change is within an acceptable range. The acceptable range is, for example, the range from zero up to the size of a block or macroblock, or from zero up to the size of a block multiplied by a predetermined constant. If the change is within the acceptable range, the motion-vector change tester 68 sends the motion-vector decision unit 70 an error concealment signal designating temporal replacement. If the change is not within the acceptable range, the motion-vector change tester 68 sends the motion-vector decision unit 70 an error concealment signal designating DC replacement.

The motion-vector decision unit 70 also receives an error signal produced by the motion-vector size tester 58 as described in the second embodiment. If either the motion-vector size tester 58 or the motion-vector change tester 68 designates temporal replacement, the motion-vector decision unit 70 sends the primary decision unit 60 an error concealment signal designating temporal replacement. If the motion-vector size tester 58 and motion-vector change tester 68 both designate DC replacement, the motion-vector decision unit 70 sends the primary decision unit 60 an error signal designating DC replacement.

Next, the operation of the decoder 66 will be described, with primary attention once again to the concealment of errors in intra-blocks.

For the sake of brevity, the motion vector of an erroneous block will be said to be close to the preceding motion vector of the same block if the difference between the two motion vectors is within the acceptable range, and to differ greatly from the preceding motion vector if the difference is outside the acceptable range. A motion vector that is close to the preceding motion vector of the same block is a strong indication that temporal replacement is likely to produce a close match to the correct data, even if the size of the motion vector is large.

When the decoding unit 32 detects an error in an intra-block, the motion-vector interpolator 56 sends the interpolated motion vector of the intra-block to the motion-vector size tester 58 and motion-vector change tester 68. If the motion vector is small in size, the motion-vector size tester 58 selects temporal replacement. If the motion vector is close to the preceding motion vector of the block, the motion-vector change tester 68 selects temporal replacement. In either of these cases, the motion-vector decision unit 70 selects temporal replacement, causing the primary decision unit 60 to select temporal replacement, so the error is concealed by temporal replacement.

Similarly, if the DC coefficient value of the block is determined to be unreliable, or is missing, the DC value tester 34 selects temporal replacement, causing the primary decision unit 60 to select temporal replacement, and the error is again concealed by temporal replacement.

If the motion vector of the block is large, and differs greatly from the preceding motion vector of the block, and if the DC coefficient of the block appears to be reliable, then the DC value tester 34, motion-vector size tester 58, motion-vector change tester 68, motion-vector decision unit 70, and primary decision unit 60 all select DC replacement, and the error is concealed by DC replacement.

The primary decision unit 60 thus selects temporal replacement when either the small size of the motion vector or its closeness to the preceding motion vector of the block indicates that temporal replacement is likely to produce a close match to the correct data. As in the second embodiment, the primary decision unit 60 also selects temporal replacement when the DC coefficient appears unreliable. DC replacement is used only when all three tested conditions (motion-vector size, motion-vector change, and DC coefficient reliability) indicate that DC replacement is preferable.

Non-erroneous blocks are decoded as described in the first embodiment. Inter-block errors are concealed in the same way as intra-block errors.

The third embodiment provides effects generally similar to those of the second embodiment, but expands the set of conditions under which temporal replacement is used to include the case of motion vectors that are large in size but close in value to the preceding motion vector. This is also a case in which temporal replacement usually leads to better picture quality than DC replacement.

Figure 10:
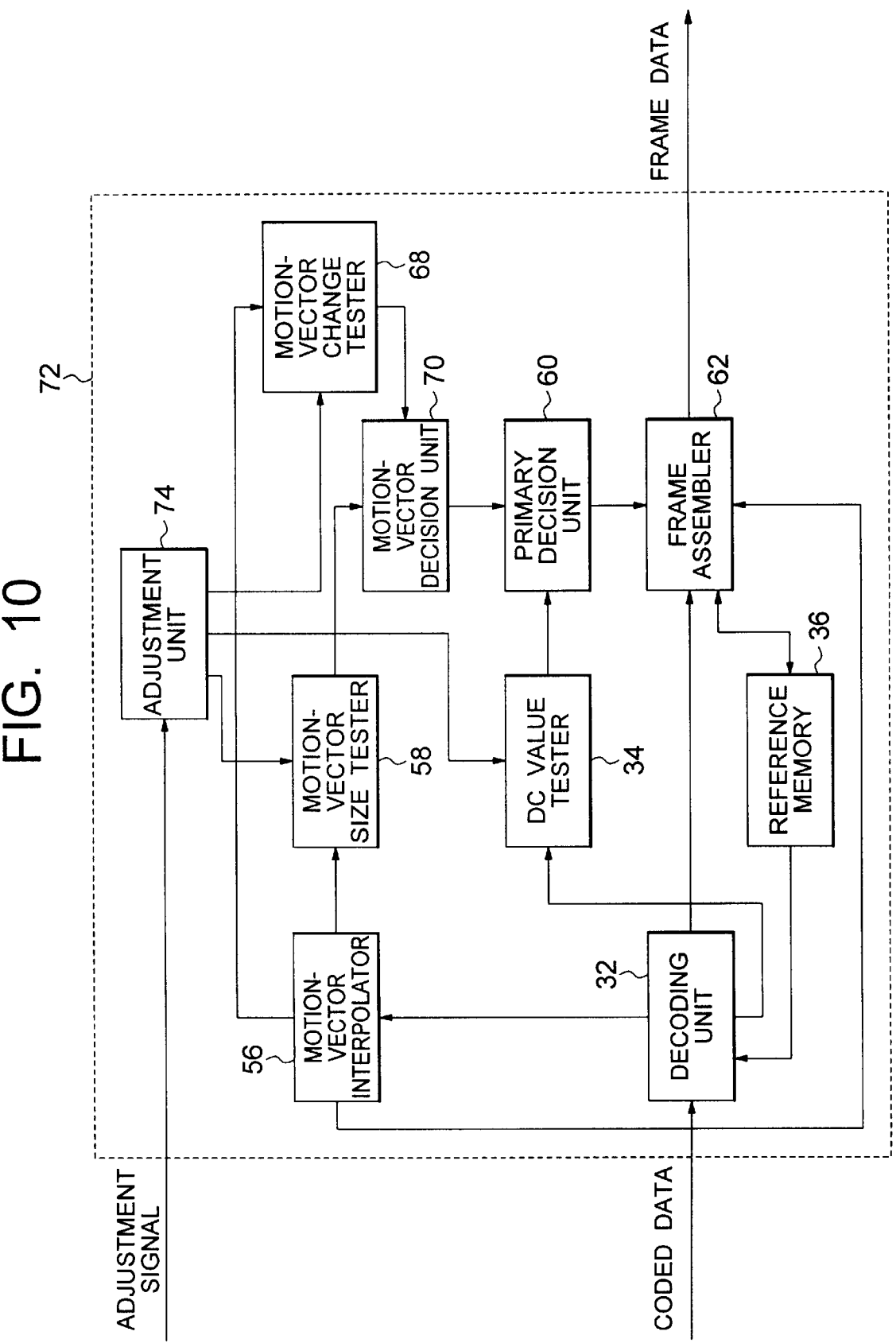
FIG. 10 is a block diagram illustrating a decoder in a fourth embodiment.

The fourth embodiment of the invented data transmission system includes the conventional coder 2 of FIG. 1 and the decoder 72 shown in FIG. 10. This decoder 72 adds an adjustment unit 74 to the configuration of the decoder 66 in the third embodiment. The adjustment unit 74 receives an adjustment signal from, for example, a manual control device (not visible) operated by a user of the decoder 72, and supplies control signals to the DC value tester 34, motion-vector size tester 58, and motion-vector change tester 68. The control signals adjust the size of the predicted range of DC values used by the DC value tester 34, and the sizes of the acceptable ranges used by the motion-vector size tester 58 and motion-vector change tester 68. The other elements of the decoder 72 operate as described in the third embodiment.

The adjustment signal is, for example, a serial data signal designating the desired sizes of the predicted range of DC values, the acceptable range of motion-vector sizes, and the acceptable range of motion-vector changes separately, so that these three ranges can be adjusted independently. Alternatively, the adjustment signal may designate a single parameter, on the basis of which the adjustment unit 74 adjusts all three ranges. In this case, the adjustment unit 74 is provided with an internal table (not visible) for converting the parameter value into control-signal values, or with computational means (not visible) for calculating the control-signal values from the parameter value according to predetermined mathematical formulas.

Aside from permitting external adjustment of the ranges used by the DC value tester 34, motion-vector size tester 58, and motion-vector change tester 68, the decoder 72 operates as described in the third embodiment, so a detailed description will be omitted.

The fourth embodiment enables the error concealment operations in the third embodiment to be optimized according to the type of moving-picture signal. Temporal replacement is most successful and reliable when comparatively little motion is present and scene changes are absent or rare. Substantial improvements in error-concealment performance are possible if different adjustments are made for videoconferencing signals, news programs, movies, sports programs, and so on.

The fourth embodiment also enables different users to adjust the error concealment method according to their own preferences.

In a variation of the fourth embodiment, the adjustment signal is generated by the coder, enabling error concealment to be optimized without requiring intervention by the user of the decoder.

The fifth embodiment of the invented data transmission system includes a novel coder and a novel decoder.

Figure 11:
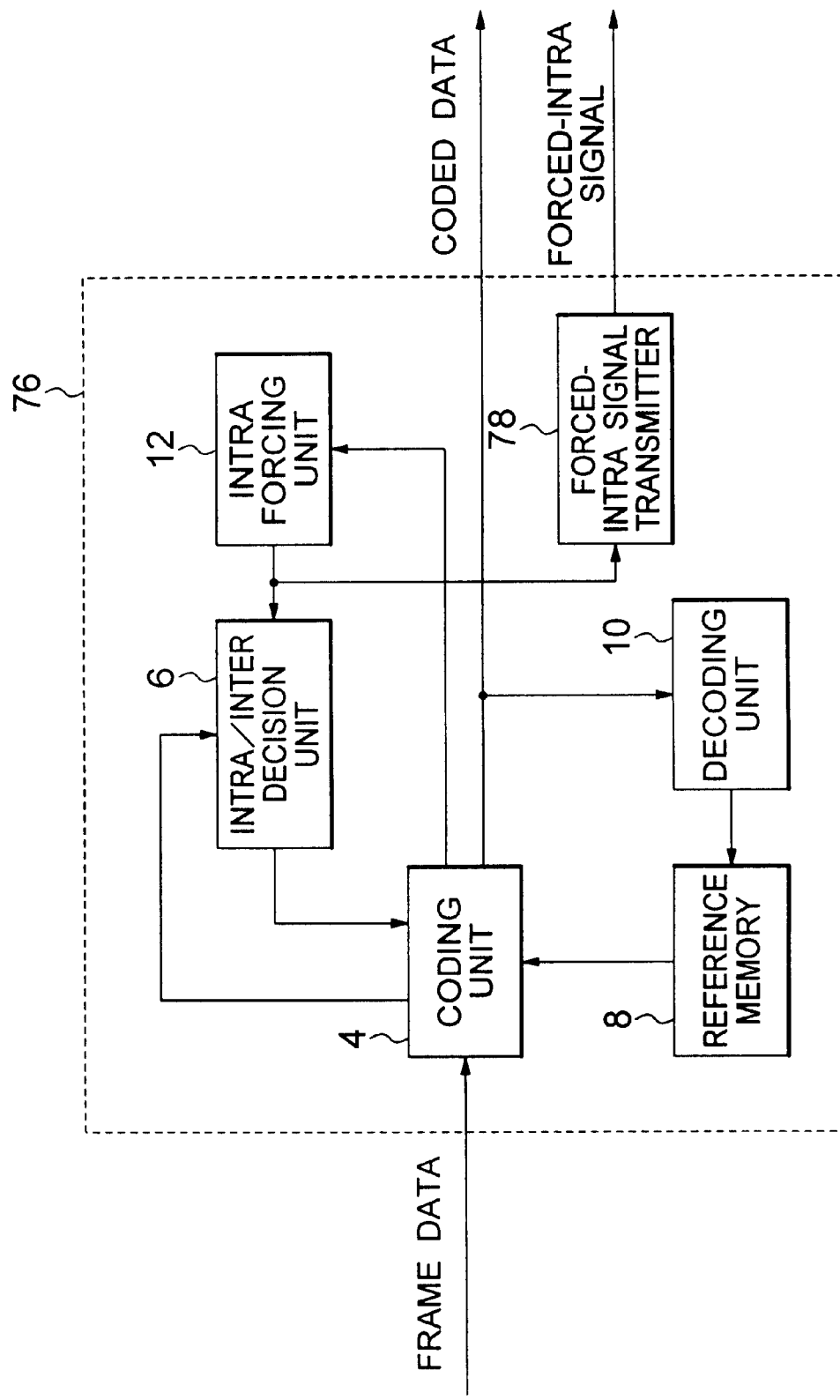
FIG. 11 is a block diagram illustrating a coder in a fifth embodiment.

Referring to FIG. 11, the coder 76 adds a forced-intra signal transmitter 78 to the conventional coder 2 shown in FIG. 1. When the intra forcing unit 12 forces the intra/inter decision unit 6 to select intra-frame coding, it also notifies the forced-intra signal transmitter 78, which transmits a forced-intra signal to the decoder. The forced-intra signal is shown being transmitted separately from the coded data, but this signal may of course be multiplexed into the coded data stream.

Figure 12:
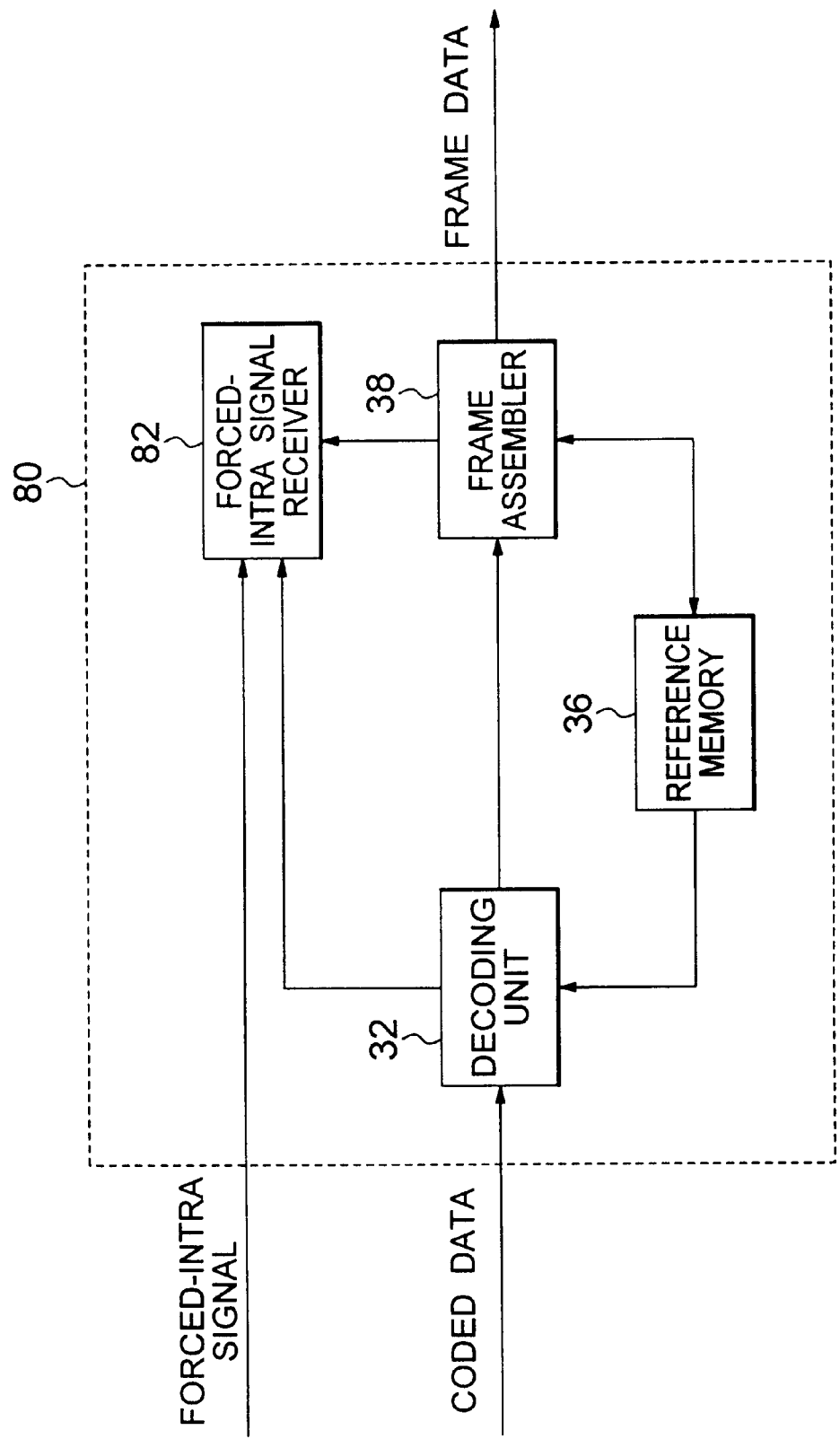
FIG. 12 is a block diagram illustrating a decoder in the fifth embodiment.

Referring to FIG. 12, the decoder 80 replaces the DC value tester 34 of the decoder 30 in the first embodiment with a forced-intra signal receiver 82 that receives the forced-intra signal transmitted by the coder 76. The decoding unit 32 notifies the forced-intra signal receiver 82 of decoding errors. The forced-intra signal receiver 82 then selects an error concealment method and sends the frame assembler 38 an error concealment signal designating the selected method.

When notified of an error in an intra-block, the forced-intra signal receiver 82 selects temporal replacement if the intra-block is a forced intra-block, as indicated by reception of a forced-intra signal. If the intra-block is not a forced intra-block, as indicated by non-reception of a forced-intra signal, the forced-intra signal receiver 82 selects DC replacement. When notified of an error in an inter-block, the forced-intra signal receiver 82 always selects temporal replacement.

The other elements of the coder 76 and decoder 80 operate as in the first embodiment, so a detailed description will be omitted.

Non-forced intra-blocks are those for which intra-frame coding is more efficient than inter-frame coding. In general, a non-forced intra-block either has only a small AC component, or differs greatly from the corresponding block in the preceding frame. In either case, DC replacement is an appropriate choice for error concealment.

Most forced intra-blocks are blocks for which inter-frame coding would have been selected if the intra forcing unit 12 had not intervened. Accordingly, forced intra-blocks usually do not differ very much from the corresponding block in the preceding frame, and the frame assembler 38 in the decoder 80 can usually identify the corresponding block in the preceding frame fairly accurately by interpolation of motion vectors from adjacent blocks. For these forced intra-blocks, temporal replacement produces effective error concealment.

For inter-blocks, as noted above, there is usually little difference between DC replacement and temporal replacement. Temporal replacement conceals errors in inter-blocks effectively most of the time.

By adding a forced-intra signal transmitter 78 to the coder, and providing a forced-intra signal receiver 82 in the decoder, the fifth embodiment provides an extremely simple way of choosing the more effective of the two error concealment methods.

In a preferred variation of the fifth embodiment, the operation of the coder 76 is slightly modified. The intra/inter decision unit 6 does not give the coding unit 4 advance notice of forced intra-blocks. The coding unit 4 always performs the preliminary processes that yield estimates of the amount of coded data that will be produced by intra-frame and inter-frame coding, enabling the intra/inter decision unit 6 to select the more efficient coding method. If the intra/inter decision unit 6 selects intra-frame coding, the block is not treated as a forced intra-block, even if it follows N consecutive frames with inter-frame coding of the same block. The intra forcing unit 12 forces intra-frame coding, by overriding the selection made by the intra/inter decision unit 6, only when the intra/inter decision unit 6 selects inter-frame coding after N consecutive frames of inter-frame coding of the same block. In this variation, forced intra-blocks always resemble the corresponding block in the preceding frame, making temporal replacement the correct choice.

In another variation, the fifth embodiment also incorporates the selection criteria of any one of the preceding embodiments, by adding a forced-intra signal transmitter 78 to the coder and a forced-intra signal receiver 82 to the decoder in the preceding embodiment. In this variation, temporal replacement is selected for an erroneous non-forced intra-block if the DC coefficient of the block is determined to be unreliable. Temporal replacement may also be selected for an erroneous non-forced intra-block if the intra-block has a small interpolated motion vector, or if the motion vector is close to the preceding motion vector 6f the same block.

Taken together, the embodiments above use four criteria to decide between temporal replacement and DC replacement for concealment of intra-block errors. The four criteria are the DC coefficient value, motion-vector size, motion-vector change, and whether the intra-block was forced or not. More specifically, four conditions are set for selecting DC replacement: (A) DC coefficient value in predicted range; (B) large motion vector; (C) large change in motion vector; and (D) non-forced intra-block. The first embodiment uses condition A alone. The second embodiment requires conditions A and B. The third embodiment requires conditions A, B, and C. The fifth embodiment uses condition D alone, or in combination with condition A, conditions A and B, or conditions A, B, and C.

The invention can also be practiced with other combinations of conditions A, B, C, and D. Any one of the four conditions can be used alone; any two of the four conditions can be used together; any three of the four conditions can be used; or all four conditions can be used. Whenever any one or more of conditions A, B, and C is used, the condition can be adjusted by means of an external signal, as in the fourth embodiment.

When condition A is used, the range of the DC coefficient value does not have to be predicted from the eight surrounding blocks; the range can be predicted from a subset of these blocks, or from more distant blocks that are related in some way to the erroneous block.

When conditions B and C are not used, the invention is applicable to coding methods that do not employ motion compensation.

The methods of concealing inter-block errors in the preceding embodiments can be modified in various ways. For example, temporal replacement can be used unconditionally in the first four embodiments, or the DC coefficient value can be added to the replacement data output by the temporal replacement unit 42 or 64. In these cases, the AC and DC components of an inter-block do not have to be supplied separately to the frame assembler.

Those skilled in the art will recognize that further modifications are possible within the scope claimed below.

What is claimed is:

1. A method of concealing errors in a system that divides data into frames, divides the frames into blocks, and codes and decodes at least some of the blocks by intra-frame coding, these blocks being referred to as intra-blocks, comprising the steps of:
    (a) decoding each coded intra-block to obtain an AC component and a DC component;
    (b) detecting decoding errors in said step (a);
    (c) testing at least one of the following conditions A to D, when an erroneous intra-block is detected in said step (b),
        condition A being that the DC component of the erroneous intra-block has a value within a predicted range,
        condition B being that the erroneous intra-block has a motion vector outside an acceptable range, the motion vector being obtained by interpolation,
        condition C being that the motion vector of the erroneous intra-block changes by an unacceptable amount, as compared with a preceding frame, and
        condition D being that said intra-frame coding was selected for the erroneous intra-block in preference to another coding method, instead of being forced;
    (d) replacing the erroneous intra-block with its DC component, if all of the conditions tested in said step (c) are satisfied; and
    (e) replacing the erroneous intra-block with decoded data from the preceding frame, if at least one of the conditions-tested in said step (c) is not satisfied.

2. The method of claim 1, wherein only said condition A is tested in said step (c).

3. The method of claim 1, wherein only said condition A and said condition B are tested in said step (c).

4. The method of claim 1, wherein only said condition A, said condition B, and said condition C are tested in said step (c).

5. The method of claim 1, wherein only said condition D is tested in said step (c).

6. The method of claim 1, wherein only said condition A and said condition D are tested in said step (c).

7. The method of claim 1, wherein only said condition A, said condition B, and said condition D are tested in said step (c).

8. The method of claim 1, wherein said condition A, said condition B, said condition C, and said condition D are tested in said step (c).

9. The method of claim 1, wherein only said condition A and said condition C are tested in said step (c).

10. The method of claim 1, wherein only said condition A, said condition C, and said condition D are tested in said step (c).

11. The method of claim 1, wherein only said condition B is tested in said step (c).

12. The method of claim 1, wherein only said condition C is tested in said step (c).

13. The method of claim 1, wherein only said condition B and said condition C are tested in said step (c).

14. The method of claim 1, wherein only said condition B and said condition D are tested in said step (c).

15. The method of claim 1, wherein only said condition C and said condition D are tested in said step (c).

16. The method of claim 1, wherein only said condition B, said condition C, and said condition D are tested in said step (c).

17. The method of claim 1, further comprising the steps of:
- (f) receiving an adjustment signal; and
- (g) adjusting at least one of said condition A, said condition B, and said condition C according to the external adjustment signal.

18. The method of claim 17, further comprising the step of generating the adjustment signal manually, when the coded data are decoded.

19. The method of claim 17, further comprising the step of generating the adjustment signal when the data are coded.

20. A decoder for decoding data including intra-blocks coded by intra-frame coding, comprising:
- a decoding unit decoding each intra-block to obtain a DC component and an AC component of the intra-block, and detecting errors in the intra-block;
- a condition testing unit coupled to the decoding unit, testing at least one of the following conditions A to D when an erroneous intra-block is detected,
  - condition A being that the DC component of the erroneous intra-block has a value within a predicted range,
  - condition B being that the erroneous intra-block has a motion vector outside an acceptable range, the motion vector being obtained by interpolation,
  - condition C being that the motion vector of the erroneous intra-block changes by an unacceptable amount, as compared with a preceding frame, and
  - condition D being that said intra-frame coding was selected for the erroneous intra-block in preference to another coding method, instead of being forced; and
- a frame assembler coupled to the decoding unit, replacing the erroneous intra-block with its DC component if all of the at least one of said conditions A to D tested by the condition testing unit are satisfied, and replacing the erroneous intra-block with decoded data from the preceding frame, if at least one of the conditions A to D tested by the condition testing unit is not satisfied.

21. The decoder of claim 20, wherein the condition testing unit comprises a DC value tester deriving the predicted range of the DC component of the erroneous intra-block from other blocks, and testing said condition A.

22. The decoder of claim 20, wherein the condition testing unit comprises:
- a motion-vector interpolator obtaining said motion vector by interpolation; and
- a motion-vector size tester testing said condition B.

23. The decoder of claim 20, wherein the condition testing unit comprises:
- a motion-vector interpolator obtaining said motion vector by interpolation; and
- a motion-vector change tester testing said condition C.

24. The decoder of claim 20, further comprising an adjustment unit receiving an external signal and sending the condition testing unit a control signal adjusting at least one of said condition A, said condition B, and said condition C according to the external signal.

25. The decoder of claim 24, wherein the external signal is received from a user of the decoder.

26. The decoder of claim 24, wherein the external signal originates from a coder that generated the coded data.

27. The decoder of claim 20, wherein the condition testing unit comprises:
- a forced-intra signal receiver receiving a signal indicating forced intra-frame coding, and testing said condition D.

28. A data transmission system, comprising:
- the decoder of said claim 27; and
- a coder having an intra/inter decision unit selecting between inter-frame coding and said intra-frame coding, an intra forcing unit forcing the intra/inter decision unit to select said intra-frame coding at certain times, and a forced-intra signal transmitter transmitting said signal indicating forced intra-frame coding to said decoder, when the intra forcing unit forces the intra/inter decision unit to select said intra-frame coding.

29. A data transmission system, comprising:
- the decoder of claim 20; and
- a coder coding said data and transmitting the coded data to said decoder.

30. A coder for coding data divided into frames by dividing the frames into blocks, estimating amounts of coded data produced by intra-frame coding and inter-frame coding of the blocks, selecting one of said intra-frame coding and said inter-frame coding for each block according to the estimated amounts of coded data, and coding each block by the selected coding method, comprising:
- an intra forcing unit forcing intra-frame coding to be selected at certain times, regardless of said estimated amounts of coded data; and
- a forced-intra signal transmitter coupled to the intra forcing unit generating a signal indicating forced intra-frame coding, when the intra forcing unit forces intra-frame coding to be selected, and supplying output of said signal for use in error concealment when the coded data are decoded.

31. The coder of claim 30, wherein the intra forcing unit forces said intra-frame coding by overriding a selection of inter-frame coding, made according to said estimated amounts of coded data.

* * * * *